US012679351B2

(12) United States Patent
Gutmann

(10) Patent No.: US 12,679,351 B2
(45) Date of Patent: Jul. 14, 2026

(54) REAR IMPACT AVOIDANCE ASSIST

(71) Applicant: GM GLOBAL TECHNOLOGY OPERATIONS LLC, Detroit, MI (US)

(72) Inventor: Ryan J. Gutmann, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/964,995

(22) Filed: Dec. 2, 2024

(65) Prior Publication Data

US 2026/0152176 A1 Jun. 4, 2026

(51) Int. Cl.
| | |
|---|---|
| B60W 10/20 | (2006.01) |
| B60W 10/18 | (2012.01) |
| B60W 30/09 | (2012.01) |
| B60W 30/095 | (2012.01) |
| B60W 50/00 | (2006.01) |

(52) U.S. Cl.
CPC ............ B60W 30/09 (2013.01); B60W 10/18 (2013.01); B60W 10/20 (2013.01); B60W 30/0956 (2013.01); B60W 50/0097 (2013.01); B60W 2540/10 (2013.01); B60W 2540/12 (2013.01); B60W 2540/18 (2013.01)

(58) Field of Classification Search
CPC ...... B60W 30/09; B60W 10/18; B60W 10/20; B60W 30/0956; B60W 50/0097; B60W 2540/10; B60W 2540/12; B60W 2540/18
See application file for complete search history.

(56) References Cited

U.S. PATENT DOCUMENTS

| | | | | |
|---|---|---|---|---|
| 2006/0097570 | A1* | 5/2006 | Doerr .................... | B60Q 1/44 |
| | | | | 303/193 |
| 2020/0122773 | A1* | 4/2020 | Deshpande ............. | B60T 7/12 |

FOREIGN PATENT DOCUMENTS

| | | |
|---|---|---|
| DE | 102009025607 A1 | 2/2010 |
| DE | 102012215173 A1 | 3/2013 |
| DE | 102011087781 A1 | 6/2013 |
| DE | 102014206338 A1 | 10/2015 |

* cited by examiner

*Primary Examiner* — Mathew Franklin Gordon
(74) *Attorney, Agent, or Firm* — Ingrassia Fisher & Lorenz, LLP | IF&L

(57) ABSTRACT

Methods and systems are provided that include sensors that obtain sensor data as to vehicles travelling behind the host vehicle as the host vehicle is stopped or travelling in a forward direction, and a processor that is configured to: determine, using the sensor data, whether the other vehicles travelling behind the host vehicle includes a rear threat that is likely to contact the host vehicle as the host vehicle is stopped or travelling in the forward direction; and provide automated assistive commands for controlling movement of the host vehicle to avoid contact with the other vehicles travelling behind the host vehicle, when it is determined that the other vehicles travelling behind the host vehicle includes a rear threat that is likely to contact the host vehicle as the host vehicle is stopped or travelling in the forward direction.

20 Claims, 3 Drawing Sheets

REAR IMPACT AVOIDANCE ASSIST

INTRODUCTION

The technical field generally relates to vehicles and, more specifically, to methods and systems for preventing contact between a host vehicle and one or more other vehicles behind the vehicle.

Certain vehicles today have control systems for active safety for the vehicle. It may be desirable for such vehicle systems to prevent contact with other vehicles, including ones that may be behind the vehicle.

Accordingly, it is desirable to provide improved methods and systems for preventing contact between a vehicle and other vehicles behind the vehicle. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes obtaining, via one or more sensors of a host vehicle, sensor data as to one or more other vehicles travelling behind the host vehicle, as the host vehicle is stopped or travelling in a forward direction; determining, via processor of the host vehicle using the sensor data, whether the one or more other vehicles travelling behind the host vehicle includes a rear threat that is likely to contact the host vehicle as the host vehicle is stopped or travelling in the forward direction; and providing automated assistive commands for controlling movement of the host vehicle to avoid contact with the one or more other vehicles travelling behind the host vehicle, in accordance with instructions provided by the processor of the host vehicle, when it is determined that the one or more other vehicles travelling behind the host vehicle includes a rear threat that is likely to contact the host vehicle as the host vehicle is stopped or travelling in the forward direction.

Also in an exemplary embodiment, the one or more sensors include one or more rear-facing object detection sensors of the host vehicle.

Also in an exemplary embodiment, the method further includes obtaining, via one or more additional sensors of the host vehicle, additional sensor data as to an input provided by a driver of the host vehicle; wherein the automated assistive commands for controlling movement of the host vehicle are provided via the instructions provided by the processor upon a further condition that the input represents a request by the driver for automated assistance for avoiding contact with the one or more other vehicles travelling behind the host vehicle.

Also in an exemplary embodiment, the obtaining of the additional sensor data includes obtaining, via one or more steering sensors coupled to a steering wheel of the host vehicle, steering wheel data from the steering wheel; and obtaining, via one or more accelerator sensors coupled to an accelerator pedal of the host vehicle, accelerator pedal data of the accelerator pedal.

Also in an exemplary embodiment, the method further includes determining, via the processor, a predicted path for a maneuver for the host vehicle to avoid contact with the one or more other vehicles travelling behind the host vehicle, based on the steering wheel data; wherein the step of providing the automated assistive commands includes providing automated steering control commands from the processor to a steering system of the host vehicle, along with automated propulsion control commands from the processor to a drive system of the host vehicle and automated braking control commands from the processor to a braking system of the host vehicle, to assist the driver in executing the maneuver to avoid contact with the one or more other vehicles travelling behind the host vehicle.

Also in an exemplary embodiment, the method further includes obtaining front and side sensor data from one or more front and side sensors of the host vehicle as to whether the host vehicle is likely to contact one or more other vehicles, pedestrians, or other objects located in front of or to a side of the host vehicle along the predicted path; wherein the automated assistive commands for controlling movement of the host vehicle are provided via the instructions are provided by the processor upon a further condition that vehicle is not likely to contact the one or more other vehicles, pedestrians, or other objects located in front of or to a side of the host vehicle along the predicted path.

Also in an exemplary embodiment, the step of obtaining the sensor data comprises obtaining the sensor data from one or more front and side facing object detection sensors of the host vehicle.

Also in an exemplary embodiment, the automated assistive commands for controlling movement of the host vehicle utilize the front and side sensor data for avoiding contact with the one or more other vehicles, pedestrians, or other objects located in front of or to a side of the host vehicle along the predicted path.

Also in an exemplary embodiment, the method further includes obtaining braking sensor data from one or more braking sensors coupled to a brake pedal of the host vehicle; and terminating the automated steering control commands, the automated propulsion control commands, and the automated braking control commands from the processor when it is determined by the processor, based on the braking sensor data, that the driver has engaged the brake pedal of the host vehicle.

In another exemplary embodiment, a system is provided that includes one or more sensors of a host vehicle and a processor of the host vehicle. The one or more sensors are configured to obtain sensor data as to one or more other vehicles travelling behind the host vehicle, as the host vehicle is stopped or travelling in a forward direction. The processor is configured to at least facilitate determining, using the sensor data, whether the one or more other vehicles travelling behind the host vehicle includes a rear threat that is likely to contact the host vehicle as the host vehicle is stopped or travelling in the forward direction; and providing automated assistive commands for controlling movement of the host vehicle to avoid contact with the one or more other vehicles travelling behind the host vehicle, in accordance with instructions provided by the processor of the host vehicle, when it is determined that the one or more other vehicles travelling behind the host vehicle includes a rear threat that is likely to contact the host vehicle as the host vehicle is stopped or travelling in the forward direction.

Also in an exemplary embodiment, the one or more sensors include one or more rear-facing object detection sensors of the host vehicle.

Also in an exemplary embodiment, the system further includes one or more additional sensors of the host vehicle that are configured to obtain additional sensor data as to an input provided by a driver of the host vehicle; wherein the processor is further configured to at least facilitate providing the automated assistive commands for controlling movement of the host vehicle upon a further condition that the input represents a request by the driver for automated assistance for avoiding contact with the one or more other vehicles travelling behind the host vehicle.

Also in an exemplary embodiment, the one or more additional sensors include one or more steering sensors that are coupled to a steering wheel of the host vehicle and configured to obtain steering wheel data from the steering wheel; and one or more accelerator sensors that are coupled to an accelerator pedal of the host vehicle and configured to obtain accelerator pedal data of the accelerator pedal.

Also in an exemplary embodiment, the processor is further configured to at least facilitate determining a predicted path for a maneuver for the host vehicle to avoid contact with the one or more other vehicles travelling behind the host vehicle, based on the steering wheel data; and providing automated steering control commands from the processor to a steering system of the host vehicle, along with automated propulsion control commands from the processor to a drive system of the host vehicle and automated braking control commands from the processor to a braking system of the host vehicle, to assist the driver in executing the maneuver to avoid contact with the one or more other vehicles travelling behind the host vehicle.

Also in an exemplary embodiment, one or more front and side sensors of the host vehicle that are configured to obtain front and side sensor data as to whether the host vehicle is likely to contact one or more other vehicles, pedestrians, or other objects located in front of or to a side of the host vehicle along the predicted path; wherein the processor is further configured to at least facilitate providing the automated assistive commands for controlling movement of the host vehicle upon a further condition that vehicle is not likely to contact the one or more other vehicles, pedestrians, or other objects located in front of or to a side of the host vehicle along the predicted path.

Also in an exemplary embodiment, the one or more front and side sensors include one or more front and side facing object detection sensors of the host vehicle.

Also in an exemplary embodiment, the processor is further configured to at least facilitate providing the automated assistive commands for controlling movement of the host vehicle utilizing the front and side sensor data for avoiding contact with the one or more other vehicles, pedestrians, or other objects located in front of or to a side of the host vehicle along the predicted path.

Also in an exemplary embodiment, one or more braking sensors that are configured to be coupled to a brake pedal of the host vehicle and are configured to obtain braking sensor data; wherein the processor is further configured to at least facilitate terminating the automated steering control commands, the automated propulsion control commands, and the automated braking control commands when it is determined by the processor, based on the braking sensor data, that the driver has engaged the brake pedal of the host vehicle.

In another exemplary embodiment, a vehicle is provided that includes a body, a drive system, a braking system, a steering system, one or more object detection sensors, one or more steering sensors, one or more accelerator sensors, one or more braking sensors, and a processor. The drive system is configured to move the body. The drive system includes an accelerator pedal. The braking system includes a brake pedal. The steering system includes a steering wheel. The one or more object detection sensors are configured to obtain object detection sensor data as to one or more other vehicles travelling behind the vehicle, as the vehicle is stopped or travelling in a forward direction. The one or more steering sensors are coupled to the steering wheel and configured to obtain steering wheel data from the steering wheel. The one or more accelerator sensors are coupled to the accelerator pedal and configured to obtain accelerator pedal data of the accelerator pedal. The one or more braking sensors are coupled to the brake pedal and are configured to obtain brake pedal sensor data as to an engagement of the brake pedal by a driver of the vehicle. The processor of the vehicle is configured to at least facilitate determining, using the object detection sensor data, whether the one or more other vehicles travelling behind the vehicle includes a rear threat that is likely to contact the vehicle as the vehicle is stopped or travelling in the forward direction; determining, using the accelerator pedal data and the steering wheel data, whether the driver has provided an input with a request for automated assistance from the processor for avoiding contact with the one or more other vehicles travelling behind the vehicle, as the vehicle is stopped or travelling in the forward direction; providing automated assistive commands to the drive system, the steering system, and the braking system for controlling movement of the vehicle to avoid contact with the one or more other vehicles travelling behind the vehicle, in accordance with instructions provided by the processor of the vehicle, when it is determined both that: the one or more other vehicles travelling behind the vehicle includes a rear threat that is likely to contact the vehicle as the vehicle is stopped or travelling in the forward direction; and the driver of the vehicle has provided the input with the request for automated assistance from the processor for avoiding contact with the one or more other vehicles travelling behind the vehicle, as the vehicle is stopped or travelling in the forward direction; and terminating the providing of the automated assistive commands when it is determined by the processor, based on the brake pedal sensor data, that the driver has engaged the brake pedal of the vehicle.

Also in an exemplary embodiment, the vehicle further includes one or more front and side detection sensors that are configured to obtain front and side sensor data as to whether the vehicle is likely to contact one or more other vehicles, pedestrians, or other objects located in front of or to a side of the vehicle along a predicted path of a maneuver of the vehicle to avoid contact with the one or more other vehicles; wherein the processor is further configured to at least facilitate providing the automated assistive commands for controlling movement of the vehicle upon a further condition that the vehicle is not likely to contact the one or more other vehicles, pedestrians, or other objects located in front of or to a side of the vehicle along the predicted path.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
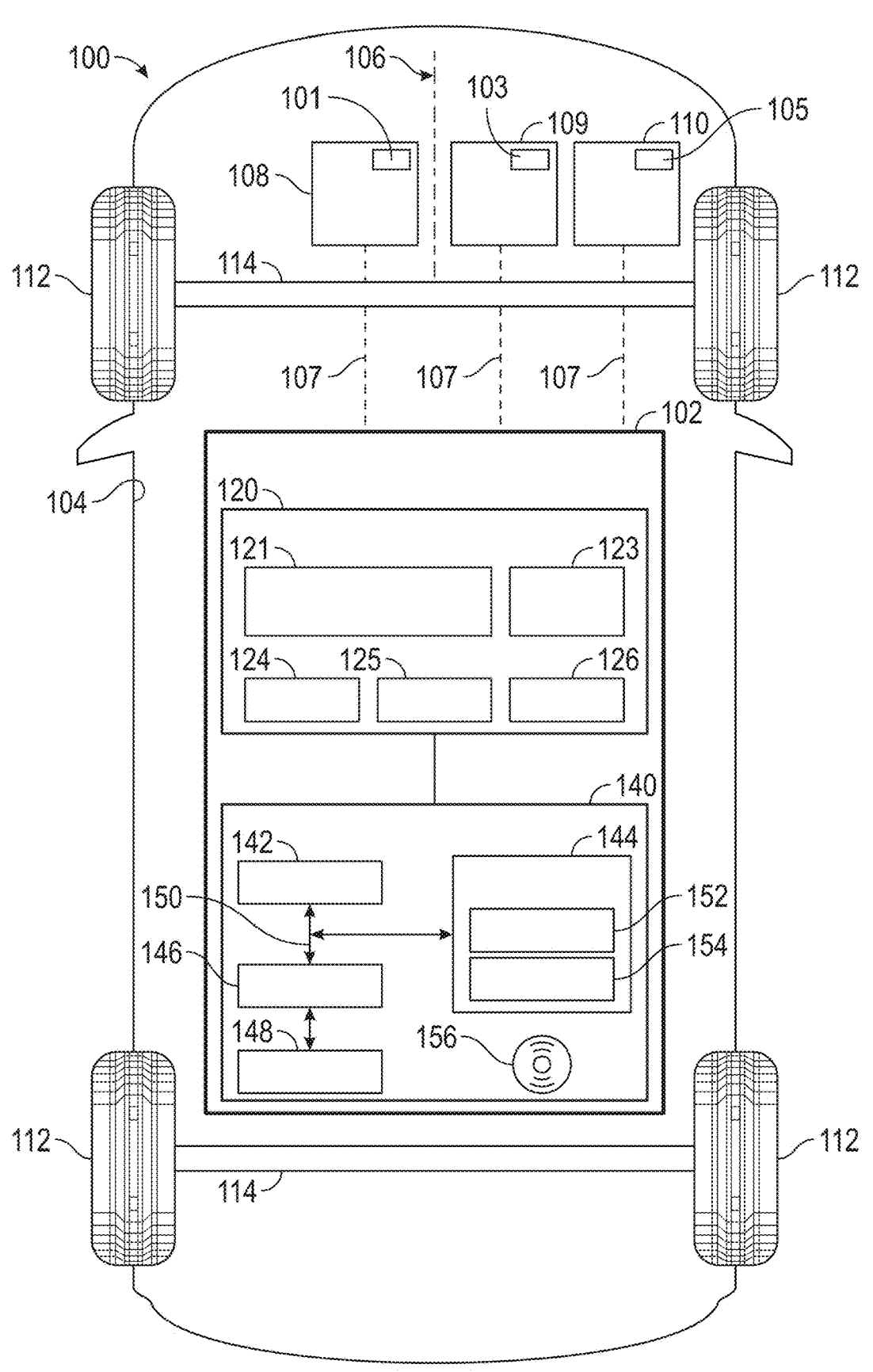
FIG. 1 is a functional block diagram of a vehicle that includes a control system for preventing contact with other vehicles behind the vehicle, in accordance with exemplary embodiments.

FIG. 1 illustrates a vehicle 100 (also referred to herein as a "host vehicle" 100), according to an exemplary embodiment. As described in greater detail further below, the vehicle 100 includes a control system 102 that is configured for preventing contact with other vehicles behind the vehicle 100, in accordance with exemplary embodiments.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, the vehicle 100 is a partially autonomous vehicle, in which operation is controlled by a human driver under ordinary circumstances, but with automated assistance via the control system 102 in various circumstance, including to avoid impact with one or more other vehicles behind the vehicle 100.

The vehicle 100 includes a body 104 that is arranged on a chassis 106. The body 104 substantially encloses other components of the vehicle 100. The body 104 and the chassis 106 may jointly form a frame. The vehicle 100 also includes a plurality of wheels 112. The wheels 112 are each rotationally coupled to the chassis 106 near a respective corner of the body 104 to facilitate movement of the vehicle 100. In one embodiment, the vehicle 100 includes four wheels 112, although this may vary in other embodiments (for example for trucks and certain other vehicles).

As depicted in FIG. 1, the vehicle includes a braking system 108 in various embodiments. In exemplary embodiments, the braking system 108 controls braking of the vehicle 100 using braking components that are controlled via inputs provided by a driver (e.g., via a brake pedal 101 in certain embodiments) in ordinary circumstances, and with automated assistance provided automatically via the control system 102 (including to avoid contact with other vehicles behind the vehicle 100).

In exemplary embodiments, the vehicle 100 also includes a steering system 109 that controls steering of the vehicle 100. In various embodiments, the steering system 109 controls steering of the vehicle 100 via steering components, for example that including a steering column that is coupled to the axles 114 and/or the wheels 112, and that is controlled via inputs provided in certain instances by a driver via a steering wheel 103 in ordinary circumstances, and with automated assistance provided automatically via the control system 102 (including to avoid contact with other vehicles behind the vehicle 100).

Also in exemplary embodiments, a drive system 110 is mounted on the chassis 106, and drives the wheels 112, for example via axles 114. In certain embodiments, the drive system 110 comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. Also in exemplary embodiments, the drive system 110 controls propulsion of the vehicle 100 in accordance with via inputs provided by a driver (e.g., via an accelerator pedal 105) in ordinary circumstances, and with automated assistance provided automatically via the control system 102 (including to avoid contact with other vehicles behind the vehicle 100).

In the embodiment depicted in FIG. 1, the control system 102 is coupled to the steering system 109, the braking system 108, and the drive system 110. In various embodiments, the control system 102 is coupled to the steering system 109, the braking system 108, and the drive system 110 via one or more communications link 107, such as a vehicle CAN bus in one embodiments. In certain embodiments, the control system 102 may also be coupled to one or more other vehicle systems and/or components.

In various embodiments, as noted above, the control system 102 detects when contact is likely with one or more other vehicles behind the vehicle 100, along with when a driver provides an input for assistance. In various embodiments, in such circumstance with these conditions, the control system provides assistance for movement of the vehicle 100 (including via providing automated control instructions for the braking system 108, the steering system 109, and the drive system 110) in order to avoid the contact with the rear vehicles behind the vehicle 100 as well as to avoid contact with any other vehicle, pedestrians, or other objects. In various embodiments, the control system 102 provides these functions in accordance with the process 200 of FIG. 2 and implementation of FIG. 3, and as described in greater detail further below in connection therewith. In certain embodiments, the control system 102 may also control one or more other systems of the vehicle 100.

As depicted in FIG. 1, in various embodiments, the control system 102 includes a sensor array 120 and a controller 140, as described in greater detail below.

In various embodiments, the sensor array 120 includes various sensors that obtain sensor data as to the vehicle 100, other vehicles and other objects in proximity to the vehicle 100, and for use in preventing contact between the vehicle 100 and the other vehicles and other objects. In the depicted embodiment, the sensor array 120 includes one or more object detection sensors 121, accelerator sensors 123, braking sensors 124, and steering sensors 125. In certain embodiments, the sensor array 120 may also include one or more other sensors 126.

In an exemplary embodiments, the one or more object detection sensors 121 obtain object detection sensor data as to one or more other vehicles in proximity to and behind the vehicle 100. In certain embodiments, the object detection sensors 121 also obtain object detection sensor data as to one or more other vehicles, pedestrians, and objects in proximity to the vehicle 100, including in front of or to the side (e.g., left or right) of the vehicle 100. In certain embodiments, the object detection sensors 121 include one or more of the following: radar sensors, cameras, Lidar sensors, and/or other object detection sensors 121

In an exemplary embodiment, the one or more accelerator sensors 123 obtain accelerator sensor data as to a driver's acceleration inputs and engagement of the drive system 110, including the driver's engagement of the accelerator pedal 105 in various embodiments.

In an exemplary embodiment, the one or more braking sensors 124 obtain braking sensor data as to a driver's braking inputs and engagement of the braking system 108, including the driver's engagement of the brake pedal 101 in various embodiments.

In an exemplary embodiment, the one or more steering sensors 125 obtain steering sensor data as to a driver's steering inputs and engagement of the steering system 109, including the driver's engagement of the steering wheel 103 in various embodiments.

In addition, in certain embodiments, the sensor array 120 may also include one or more other sensors 126, such as one or more other types of input sensors (e.g., one or more buttons, switches, touch screen display sensors, or other sensors for a driver to provide inputs to request assistance from the control system), and/or one or more other types of detection sensors (e.g., sonar, Lidar, and the like) for detecting other vehicles and other objects, and so on.

In various embodiments, the controller 140 is coupled to the sensor array 120 as well as to the braking system 108, the steering system 109, and the drive system 110. In various embodiments, the controller 140 may also be coupled to one or more other vehicle systems. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) helps to prevent contact between the vehicle 100 and other vehicles and objects, including other vehicles behind the vehicle 100. In various embodiments, the controller 140 provides these and other functions in accordance with the steps of the process 200 of FIG. 2 and implementation of FIG. 3.

In various embodiments, the controller 140 (and, in certain embodiments, the control system 102 itself) is disposed within the body 104 of the vehicle 100. In one embodiment, the control system 102 is mounted on the chassis 106. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and implementation of FIG. 3.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash).

In certain examples, the memory 144 is located on and/or co-located on the same computer chip as the processor 142. In the depicted embodiment, the memory 144 stores the above-referenced program 152 along with stored values 154 (e.g., threshold values for the process 200 of FIG. 2 and implementation of FIG. 3 in various embodiments).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 discussed further below in connection with FIG. 2. In another exemplary embodiment, the program product may be directly stored in and/or otherwise accessed by the memory 144 and/or a disk (e.g., disk 156), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
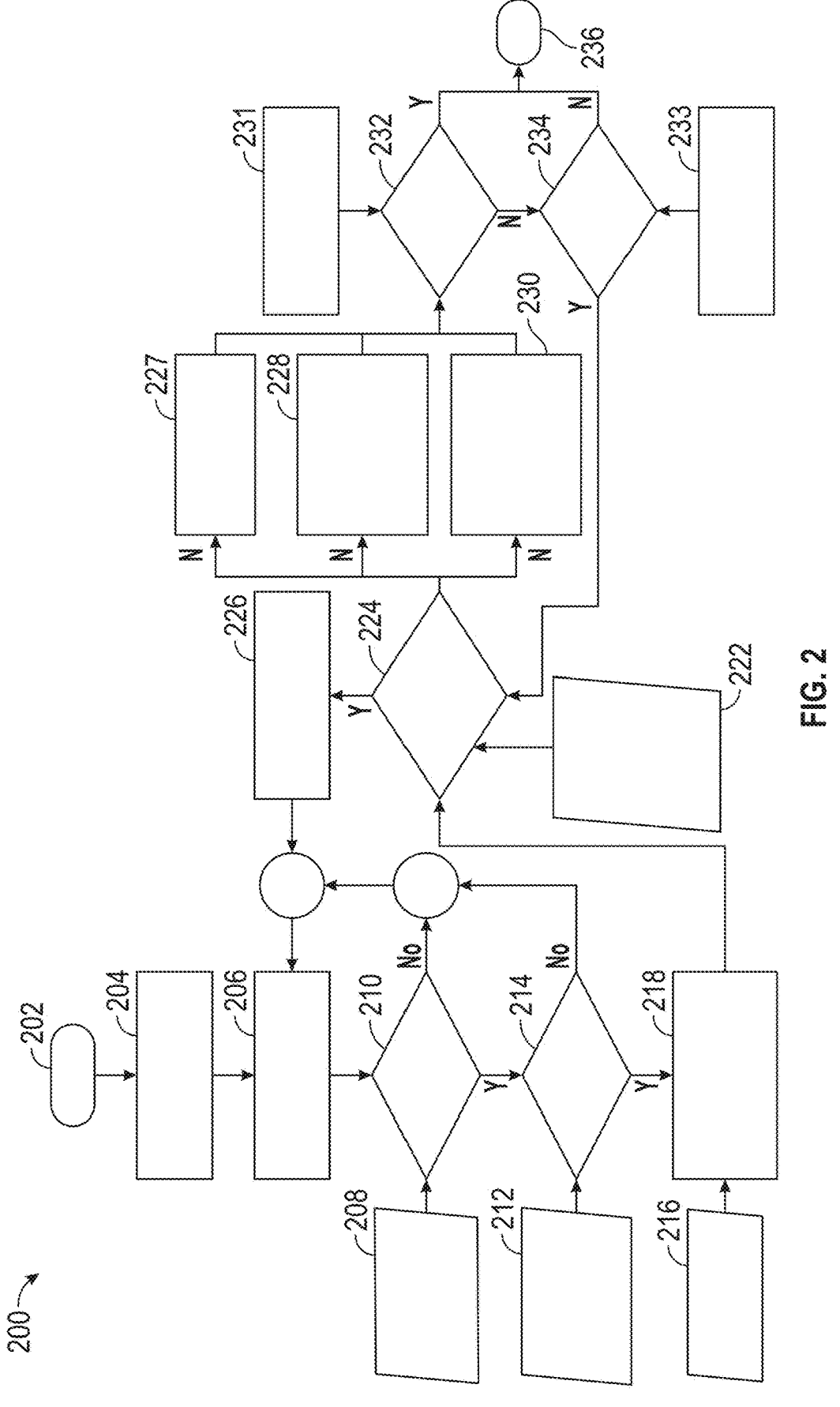
FIG. 2 is a flowchart of a process for preventing contact with other vehicles behind a vehicle, and that can be implemented in connection with the vehicle of FIG. 1, including the control system of FIG. 1, in accordance with exemplary embodiments.

FIG. 2 is a flowchart of a process 200 for preventing contact with other vehicles behind a vehicle, in accordance with exemplary embodiments. Also in various embodiments, the process 200 can be implemented in connection with the vehicle 100 of FIG. 1, including the control system 102 of FIG. 1, and components thereof.

As depicted in FIG. 2, in various embodiments, the process 200 begins at step 202. In one embodiment, the process 200 begins when a vehicle drive or ignition cycle begins, for example when a driver enters the vehicle for operation of the vehicle (e.g., as detected one or more of the sensors of the sensor array 120 of FIG. 1 in certain embodiments). In one embodiment, the steps of the process 200 are performed continuously during operation of the vehicle. In various embodiments, the process 200 is performed as the vehicle 100 is moving forward or is stopped (but not when the vehicle 100 is travelling backward in reverse).

In various embodiments, the process 200 begins during operation of the vehicle 100 under normal or typical operating conditions (step 204), for example before any contact threat is detected and before the driver has requested assistance from the control system 102 for avoiding contact with one or more other vehicles or other objects. In various embodiments, the process 200 (and the control system 102 of FIG. 1 that executes the process 200) is ready to provide rear contact assistance for the driver at any time as the vehicle 100 is stopped or moving forward (step 206).

In various embodiments, object data is obtained (step 208). In various embodiments, object data comprises object detection sensor data that is obtained via one or more object detection sensors 121 of FIG. 1 (e.g., including one or more radar sensors, cameras, Lidar sensors, and/or other object detection sensors 121), including behind the vehicle 100 and with respect to any other vehicles that may be travelling behind the vehicle 100. In various embodiments, this is performed as the vehicle 100 is travelling forward or stopped.

In various embodiments, a determination is made as to whether a rear threat is detected (step 210). In various embodiments, during step 210, the processor 142 of FIG. 1 determines, using the object data of step 208, whether any other vehicles travelling behind the vehicle 100 are likely to contact the vehicle 100 (e.g., including based on a relative heading, position, and heading of the other vehicles with respect to the vehicle 100).

In various embodiments, if it is determined in step 210 that a rear threat is not detected, then the process returns to step 206, as the process 200 (and control system 102) do not take any assistive action at this time, but remain ready to assist as needed. In various embodiments, steps 206-210 repeat in a new iteration until and unless a determination is made during an iteration of step 210 that a rear threat is detected.

In various embodiments, if it is determined in step 210 that a rear threat is detected, then additional sensor data is obtained as to the driver's intent (step 212). Specifically, in various embodiments, accelerator sensor data is obtained from one or more accelerator sensors 123 of FIG. 1 as to a position or engagement of the accelerator pedal 105 by the driver, and steering sensor data is obtained from one or more steering sensors 125 of FIG. 1 as to steering wheel sensor data from engagement of the steering wheel 103 by the driver. In certain embodiments, the steering wheel sensor data includes a steering torque applied to the steering wheel 103 by the driver; however, in other embodiments, other steering wheel sensor data may be utilized.

In various embodiments, a determination is made as to whether driver intent is detected (step 214). In various embodiments, during step 214, the processor 142 determines, based on the driver's engagement of the steering wheel 103 and/or accelerator pedal 105 as reflected in the sensor data of step 212, whether the driver is requesting assistance (i.e., from the control system 102) to avoid contact with the rear threat. In certain embodiments, the driver is deemed to be requesting assistance when a measure of engagement of the steering wheel 103 (e.g., steering wheel torque and/or in certain embodiments other steering wheel data) and/or accelerator pedal 105 (e.g., accelerator pedal position and/or in certain embodiments other accelerator pedal data) exceed respective predetermined thresholds (e.g., as stored in the memory 144 of FIG. 1 as stored values 154 thereof).

In various embodiments, if it is determined in step 214 that driver intent is not detected, then the process returns to step 206, as the process 200 (and control system 102) do not take any assistive action at this time, but remain ready to assist as needed. In various embodiments, steps 206-214 repeat in a new iteration until and unless a determination is made during an iteration of step 214 that driver intent is detected.

In various embodiments, if it is determined in step 214 that driver intent is detected, then further additional sensor data is obtained as to the driver's operation of the vehicle 100 (step 216). Specifically, in various embodiments, additional steering data is determined from the steering sensors 125 as to the engagement of the steering wheel 103 by the driver.

In various embodiments, determinations are made as to a predicted driver intended path and a resulting planned trajectory of the vehicle 100 (step 218). In various embodiments, the predicted driver intended path and a resulting planned trajectory of the vehicle 100 are determined by the processor 142 based on the additional sensor data of step 216, including as to the engagement of the steering wheel 103 by the driver.

In various embodiments, front and side sensor data are obtained (step 222). In various embodiments, sensor data is obtained as to other vehicles, pedestrians, and other objects in proximity to the vehicle 100, including in front of the vehicle 100 and to both sides (e.g., left and right) of the vehicle 100. In various embodiments, these objects are detected via front and side sensors of the vehicle 100. In certain embodiments, the sensor data of step 222 is obtained via the cameras 122 of FIG. 1, and/or in certain embodiments via one or more other detection sensors (e.g., radar, Lidar, sonar, or the like).

In various embodiments, a determination is made as to whether the predicted path is obstructed (step 224). In various embodiments, the processor 142 determines whether the predicted path of step 218 (i.e., for the vehicle 100 to avoid contact with the rear threat) includes any other vehicles, pedestrians, or other objects that would be likely to contact the vehicle 100 as the vehicle 100 travels through the predicted path. In various embodiments, the processor 142 makes this determination based on the front and side sensor data of step 222, including based on relative headings, positions, velocities, and accelerations of the other vehicles, pedestrians, and other objects with respect to the vehicle 100 and its predicted path as determined based on the front and side sensor data of step 222.

In various embodiments, if it is determined in step 224 that the predicted path is obstructed, then the control system 102 (e.g., including a rear contact assist functionality thereof) is deemed to be not ready to assist (step 226). In various embodiments, the process 200 thus returns to step 206, as the process 200 (and control system 102) do not take any assistive action at this time, but remain ready to assist as needed. In various embodiments, steps 206-224 repeat in a new iteration until and unless a determination is made during an iteration of step 224 unless the predicted path is not obstructed.

In various embodiments, if it is determined in step 224 that the predicted path is not obstructed, then the process 200 instead proceeds to 227, 228, and 230, as described below.

In various embodiments, during step 227, braking assistance is provided to help the driver execute the maneuver. Specifically, in various embodiments, the processor 142 provides instructions to the braking system 108, via the communications link 107, for automated braking control to help the driver execute the maneuver. Specifically, in various embodiments, the processor 142 provides corrective braking to assist the driver in executing the maneuver, including in order to allow the vehicle 100 to avoid contact with the rear threat as well as to avoid contact with any other vehicles, pedestrians, and other objects that may be in proximity to the vehicle 100 and/or to the projected path. In various embodiments, the automatic corrective braking control is provided by instructions provided by the processor 142 via instructions that are determined by the processor 142 incorporating the object detection sensor data regarding the rear threat as well as the front and side object detection sensor data of step to help avoid any contact between the host vehicle 100 and the other vehicles, pedestrians, and other objects during the maneuver.

In various embodiments, during step 228, propulsion assistance is provided to help the driver execute the maneuver. Specifically, in various embodiments, the processor 142 provides instructions to the drive system 110, via the communications link 107, for automated propulsion control to help the driver execute the maneuver. Specifically, in various embodiments, the processor 142 provides automatic throttle adjustments and assistance (i.e., by increasing or limiting throttle and propulsion for the drive system 110 as appropriate) in order to allow the vehicle 100 to avoid contact with the rear threat as well as to avoid contact with any other vehicles, pedestrians, and other objects that may be in proximity to the vehicle 100 and/or to the projected path. In various embodiments, the automatic throttle adjustments and assistance are provided by instructions provided by the processor 142 via instructions that are determined by the processor 142 incorporating the object detection sensor data regarding the rear threat as well as the front and side objection detection sensor data of step to help avoid any contact between the host vehicle 100 and the other vehicles, pedestrians, and other objects during the maneuver.

Also in various embodiments, during step 230, steering assistance is provided to help the driver execute the maneuver. Specifically, in various embodiments, the processor 142 provides instructions to the steering system 109, via the communications link 107, for automated steering control to help the driver execute the maneuver. Specifically, in various embodiments, the processor 142 provides corrective steering torque in order to allow the vehicle 100 to avoid contact with the rear threat as well as to avoid contact with any other vehicles, pedestrians, and other objects that may be in proximity to the vehicle 100 and/or to the projected path. In various embodiments, the automatic steering control is provided by instructions provided by the processor 142 via instructions that are determined by the processor 142 incorporating the object detection sensor data regarding the rear threat as well as the front and side objection detection sensor data of step to help avoid any contact between the host vehicle 100 and the other vehicles, pedestrians, and other objects during the maneuver.

In various embodiments, further additional sensor data is obtained that includes brake pedal data (step 231), and a determination is made using the brake pedal data as to whether the driver has provided an input to end automated vehicle control (step 232). In various embodiments, the driver is determined to be provided an input with a request to end the automated vehicle control (i.e., the assistance of steps 227, 228, and 230) when the driver applies the brake pedal 101 of FIG. 1. In various embodiments, brake pedal sensor data is continuously obtained as the assistance of steps 227, 228, and 230 are performed, and the processor 142 continuously determines during this time whether the driver has engaged the brake pedal 101 (which is interpreted by the processor 142 as a request by the driver to terminate the assistance of steps 227, 228, and 230).

In various embodiments, if it is determined during step 232 that the driver has provided an input to end automated vehicle control (i.e., by engaging the brake pedal 101), then the process 200 terminates at step 236.

Conversely, in various embodiments, if it is instead determined during step 232 that the driver has not provided an input to end automated vehicle control (i.e., by engaging the brake pedal 101), then the process 200 instead proceeds to steps 233 and 234. In various embodiments, during steps 233 and 234, further additional sensor data is obtained that includes object data from rear object detection sensors (step 233), and a determination is made using the object data as to whether a rear threat is still detected (step 234). In various embodiments, this determination is made by the processor 142 similar to step 210, with updated sensor data (e.g., via updated object detection sensor data from step 208 and/or via step 233 as described above).

In various embodiments, if it is determined in step 234 that a rear threat is detected, then the process returns to step 224, and the process 200 then continues beginning with step 224 in a new iteration.

Conversely, in various embodiments, if it is instead determined in step 234 that a rear threat is not detected, then the process 200 terminates at step 236.

Figure 3:
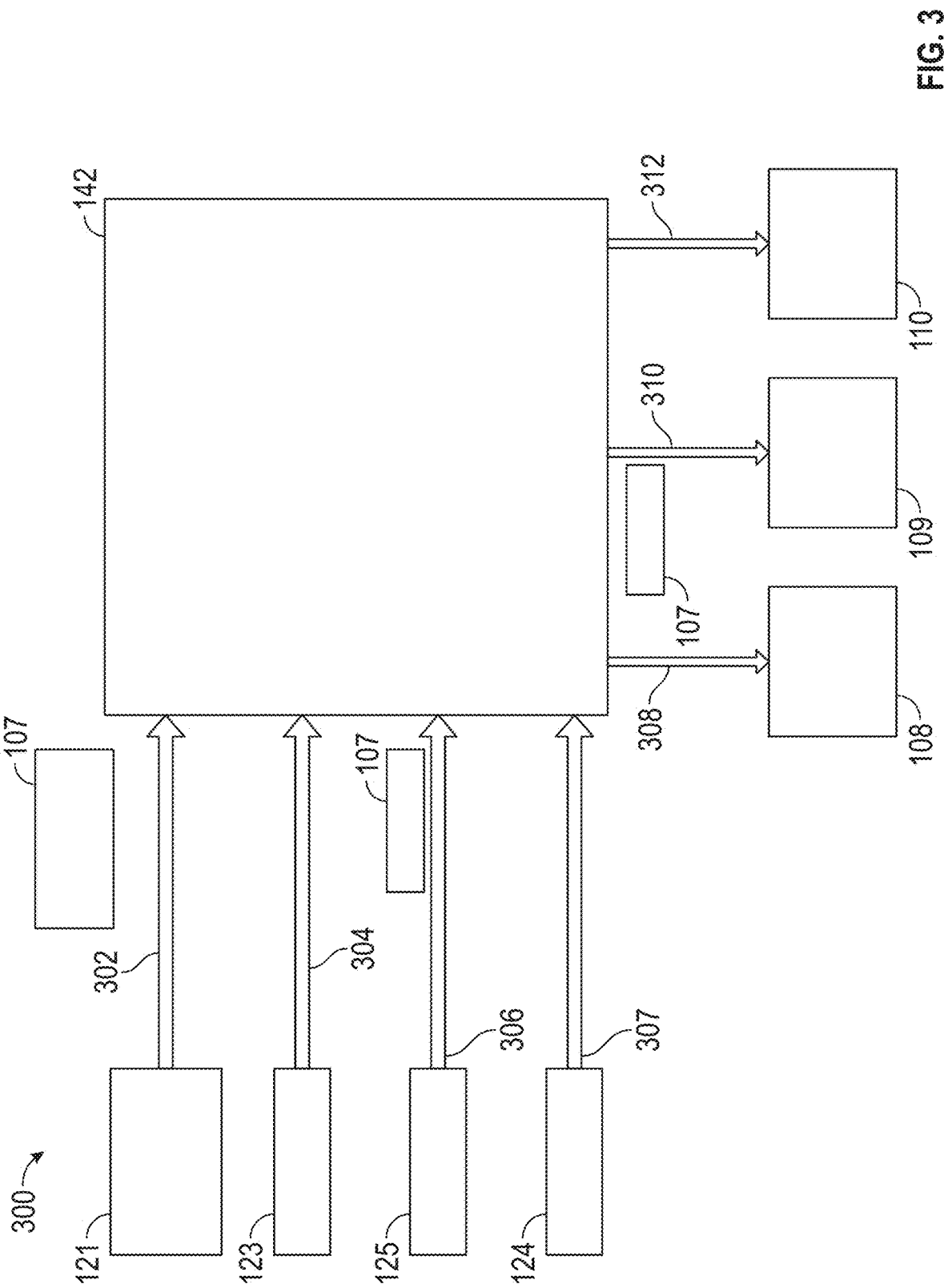
FIG. 3 is a flow diagram of an exemplary implementation of the process of FIG. 2, in accordance with exemplary embodiments.

FIG. 3 depicts an exemplary implementation of the process 200 of FIG. 2, in accordance with exemplary embodiments. As depicted in FIG. 2, in an exemplary embodiment, the processor 142 (e.g., as part of a safety control system in various embodiments) receives, via the communications link 107, the following sensor data: (i) object detection sensor data 302 of other vehicles behind the vehicle 100 and of other vehicles and other objects in proximity to the vehicle 100, via the objection detection sensors 121; (ii) accelerator pedal position sensor data 304 from the accelerator sensors 123; (iii) steering angle sensor data 306 from the steering sensors 125; and (iv) brake pedal position sensor data 307 from the braking sensors 124 of FIG. 1. Also in various embodiments and as depicted in FIG. 3, the processor 142 utilizes the object detection sensor data 302, the accelerator pedal position sensor data 304, the steering angle sensor data 306, and the brake pedal position sensor data 307 in assisting the driver in making the evasive maneuver to avoid contact with the rear threat while also avoiding contact with any other vehicles, pedestrians, or other objects in proximity to the vehicle 100 and/or the intended path, by providing automated vehicle control and assistance via the following: (i) brake commands 308 provided to the braking system 108; (ii) steering commands 310 provided to the steering system;

and (iii) torque commands 312 provided to the drive system 110 (all via the communications link 107).

Accordingly, methods, systems, and vehicles are provided for helping to prevent contact between a vehicle and other vehicles (including behind the vehicle), and further preventing contact between the vehicle and other vehicles and other objects in various directions with respect to the vehicle. In various embodiments, a control system including sensors and a processor detect a contact threat from another vehicle behind the vehicle, and further detect the driver's request for assistance to avoid contact with the threat. In various embodiments, the control system provides assistance for steering, accelerating, and braking of the vehicle to help avoid contact with the rear contact threat as well as to help prevent contact with other vehicles, pedestrians, and other objects in proximity to the vehicle.

It will be appreciated that the systems, vehicles, and methods may vary from those depicted in the Figures and described herein. For example, the vehicle 100 of FIG. 1, the control system 102 of FIG. 1, and/or components thereof may vary in different embodiments. It will similarly be appreciated that the steps of the process 200 may differ from that depicted in FIG. 2, and/or that various steps of the process 200 may occur concurrently and/or in a different order than that depicted in FIG. 2. It will also be appreciated that the implementations may differ in certain embodiments from that depicted in FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
obtaining, via one or more first sensors of a host vehicle, first sensor data as to one or more other vehicles travelling behind the host vehicle, as the host vehicle is stopped or travelling in a forward direction;
obtaining, via one or more additional sensors of the host vehicle, additional sensor data as to an input provided by a driver of the host vehicle, including steering wheel data as to engagement by the driver of a steering wheel of the vehicle and accelerator pedal data as to engagement by the driver of an accelerator pedal of the vehicle;
determining, via processor of the host vehicle using the first sensor data, whether the one or more other vehicles travelling behind the host vehicle comprises a rear threat that is likely to contact the host vehicle as the host vehicle is stopped or travelling in the forward direction;
determining, via the processor using the additional sensor data, including the steering wheel data, the accelerator pedal data, or both, whether the driver is requesting assistance to avoid contact with the one or more other vehicles travelling behind the host vehicle; and
when it is determined that both (a) the one or more vehicles travelling behind the host vehicle comprises a rear threat that is likely to contact the vehicle, and (b) the driver is requesting assistance via engagement of the steering wheel, the accelerator pedal, or both to avoid contact with the one or more other vehicles travelling behind the host vehicle, then:
determining, via the processor, an intended path and a resulting planned trajectory of the vehicle, based on the steering wheel data; and
providing automated assistive commands for controlling movement of the host vehicle to avoid contact with the one or more other vehicles travelling behind the host vehicle, in accordance with instructions provided by the processor of the host vehicle, including by automatically controlling steering, braking, and throttle for the vehicle in accordance with instructions provided by the processor in executing an automated maneuver for the vehicle to follow the intended path and the resulting planned trajectory to avoid contact with the one or more other vehicles travelling behind the host vehicle.

2. The method of claim 1, wherein the one or more sensors comprise one or more rear-facing object detection sensors of the host vehicle.

3. The method of claim 1, further comprising:
obtaining front and side sensor data from one or more front and side sensors of the host vehicle as to whether the host vehicle is likely to contact one or more other vehicles, pedestrians, or other objects located in front of or to a side of the host vehicle along the predicted path;
wherein the automated assistive commands for controlling movement of the host vehicle are provided via the instructions are provided by the processor upon a further condition that vehicle is not likely to contact the one or more other vehicles, pedestrians, or other objects located in front of or to a side of the host vehicle along the predicted path.

4. The method of claim 3, wherein the step of obtaining the sensor data comprises obtaining the sensor data from one or more front and side facing object detection sensors of the host vehicle.

5. The method of claim 3, wherein the automated assistive commands for controlling movement of the host vehicle utilize the front and side sensor data for avoiding contact with the one or more other vehicles, pedestrians, or other objects located in front of or to a side of the host vehicle along the predicted path.

6. The method of claim 1, further comprising:
obtaining braking sensor data from one or more braking sensors coupled to a brake pedal of the host vehicle; and
terminating the automated steering control commands, the automated propulsion control commands, and the automated braking control commands from the processor when it is determined by the processor, based on the braking sensor data, that the driver has engaged the brake pedal of the host vehicle.

7. A system comprising:
one or more first sensors of a host vehicle that are configured to obtain first sensor data as to one or more other vehicles travelling behind the host vehicle, as the host vehicle is stopped or travelling in a forward direction;
one or more additional sensors of the host vehicle that are configured to obtain additional sensor data as to an input provided by a driver of the host vehicle, including steering wheel data as to engagement by the driver of a steering wheel of the vehicle and accelerator pedal data as to engagement by the driver of an accelerator pedal of the vehicle; and a processor of the host vehicle that is configured to at least facilitate:

determining, using the first sensor data, whether the one or more other vehicles travelling behind the host vehicle comprises a rear threat that is likely to contact the host vehicle as the host vehicle is stopped or travelling in the forward direction;

determining, using the additional sensor data, including the steering wheel data, the accelerator pedal data, or both, whether the driver is requesting assistance to avoid contact with the one or more other vehicles travelling behind the host vehicle; and when it is determined that both (a) the one or more vehicles travelling behind the host vehicle comprises a rear threat that is likely to contact the vehicle, and (b) the driver is requesting assistance via engagement of the steering wheel, the accelerator pedal, or both to avoid contact with the one or more other vehicles travelling behind the host vehicle, then:

determining, via the processor, an intended path and a resulting planned trajectory of the vehicle, based on the steering wheel data; and providing automated assistive commands for controlling movement of the host vehicle to avoid contact with the one or more other vehicles travelling behind the host vehicle, in accordance with instructions provided by the processor of the host vehicle, including by automatically controlling steering, braking, and throttle for the vehicle in accordance with instructions provided by the processor in executing an automated maneuver for the vehicle to follow the intended path and the resulting planned trajectory to avoid contact with the one or more other vehicles travelling behind the host vehicle.

8. The system of claim 7, wherein the one or more sensors comprise one or more rear-facing object detection sensors of the host vehicle.

9. The system of claim 7, further comprising:

one or more front and side sensors of the host vehicle that are configured to obtain front and side sensor data as to whether the host vehicle is likely to contact one or more other vehicles, pedestrians, or other objects located in front of or to a side of the host vehicle along the predicted path;

wherein the processor is further configured to at least facilitate providing the automated assistive commands for controlling movement of the host vehicle upon a further condition that vehicle is not likely to contact the one or more other vehicles, pedestrians, or other objects located in front of or to a side of the host vehicle along the predicted path.

10. The system of claim 9, wherein the one or more front and side sensors comprise one or more front and side facing object detection sensors of the host vehicle.

11. The system of claim 9, wherein the processor is further configured to at least facilitate providing the automated assistive commands for controlling movement of the host vehicle utilizing the front and side sensor data for avoiding contact with the one or more other vehicles, pedestrians, or other objects located in front of or to a side of the host vehicle along the predicted path.

12. The system of claim 7, further comprising:

one or more braking sensors that are configured to be coupled to a brake pedal of the host vehicle and the at are configured to obtain braking sensor data;

wherein the processor is further configured to at least facilitate terminating the automated steering control commands, the automated propulsion control commands, and the automated braking control commands when it is determined by the processor, based on the braking sensor data, that the driver has engaged the brake pedal of the host vehicle.

13. A vehicle comprising:

a body;

a drive system configured to move the body, the drive system including an accelerator pedal;

a braking system including a brake pedal;

a steering system including a steering wheel;

one or more object detection sensors that are configured to obtain object detection sensor data as to one or more other vehicles travelling behind the vehicle, as the vehicle is stopped or travelling in a forward direction;

one or more steering sensors that are coupled to the steering wheel and configured to obtain steering wheel data from the steering wheel;

one or more accelerator sensors that are coupled to the accelerator pedal and configured to obtain accelerator pedal data of the accelerator pedal;

one or more braking sensors that are coupled to the brake pedal and that are configured to obtain brake pedal sensor data as to an engagement of the brake pedal by a driver of the vehicle; and a processor of the vehicle that is configured to at least facilitate:

determining, using the object detection sensor data, whether the one or more other vehicles travelling behind the vehicle comprises a rear threat that is likely to contact the vehicle as the vehicle is stopped or travelling in the forward direction;

determining, using the accelerator pedal data and the steering wheel data, whether the driver has provided an input with a request for automated assistance from the processor for avoiding contact with the one or more other vehicles travelling behind the vehicle, as the vehicle is stopped or travelling in the forward direction;

providing automated assistive commands to the drive system, the steering system, and the braking system for controlling movement of the vehicle to avoid contact with the one or more other vehicles travelling behind the vehicle, in accordance with instructions provided by the processor of the vehicle, including by determining, via the processor, an intended path and a resulting planned trajectory of the vehicle, based on the steering wheel data, and by automatically controlling steering, braking, and throttle for the vehicle in accordance with instructions provided by the processor in executing an automated maneuver for the vehicle to follow the intended path and the resulting planned trajectory to avoid contact with the one or more other vehicles travelling behind the host vehicle, when it is determined both that:

the one or more other vehicles travelling behind the vehicle comprises a rear threat that is likely to contact the vehicle as the vehicle is stopped or travelling in the forward direction, as determined by the processor using the first sensor data; and the driver of the vehicle has provided the input with the request for automated assistance from the processor for avoiding contact with the one or more other vehicles travelling behind the vehicle, as the vehicle is stopped or travelling in the forward direction, as determined by the processor using the steering wheel data and the accelerator pedal data; and terminating the providing of the automated assistive commands when it is determined by the processor, based on the brake pedal sensor data, that the driver has engaged the brake pedal of the vehicle.

14. The vehicle of claim 13, further comprising:

one or more front and side detection sensors of the vehicle that are configured to obtain front and side sensor data as to whether the vehicle is likely to contact one or more other vehicles, pedestrians, or other objects located in front of or to a side of the vehicle along a predicted path of a maneuver of the vehicle to avoid contact with the one or more other vehicles;

wherein the processor is further configured to at least facilitate providing the automated assistive commands for controlling movement of the vehicle upon a further condition that the vehicle is not likely to contact the one or more other vehicles, pedestrians, or other objects located in front of or to a side of the vehicle along the predicted path.

15. The method of claim 1, wherein the determining as to whether the driver is requesting assistance to avoid contact with the one or more other vehicles travelling behind the host vehicle is made by the processor based on the steering wheel data as to the driver's engagement of the steering wheel.

16. The method of claim 1, wherein the determining as to whether the driver is requesting assistance to avoid contact with the one or more other vehicles travelling behind the host vehicle is made by the processor based on the accelerator pedal data as to the driver's engagement of the accelerator pedal.

17. The method of claim 1, wherein the determining as to whether the driver is requesting assistance to avoid contact with the one or more other vehicles travelling behind the host vehicle is made by the processor based on both the accelerator pedal data as to the driver's engagement of the accelerator pedal and the steering wheel data as to the driver's engagement of the steering wheel.

18. The method of claim 5, wherein the automated assistive commands for controlling movement of the host vehicle from the processor utilize the front and side sensor data for avoiding contact with the one or more other vehicles, pedestrians, or other objects located in front of or to the side of the host vehicle along the predicted path, including based on relative headings, positions, velocities, and accelerations of the other vehicles, pedestrians, and other objects with respect to the vehicle and its predicted path as determined based on the front and side sensor data.

19. The method of claim 18, wherein the automated assistive commands further comprise automatically applying, via the processor, corrective steering torque in order to allow the vehicle to avoid contact with the rear threat as well as to avoid contact with any other vehicles, pedestrians, and other objects that may be in proximity to the vehicle and the projected path.

20. The method of claim 18, wherein the automatic steering control is provided by instructions provided by the processor via instructions that are determined by the processor incorporating the first sensor data regarding the rear threat as well as the front and side objection detection sensor data of step to help avoid any contact between the host vehicle and the other vehicles, pedestrians, and other objects during the maneuver.

* * * * *